United States Patent [19]

DuRoss

[11] 3,973,041
[45] Aug. 3, 1976

[54] SUGARLESS CHEWING GUM HAVING IMPROVED SHELF LIFE

[75] Inventor: James Wix DuRoss, Claymont, Del.
[73] Assignee: ICI United States Inc., Wilmington, Del.
[22] Filed: Mar. 3, 1976
[21] Appl. No.: 663,517

[52] U.S. Cl. .................................... 426/3; 426/548
[51] Int. Cl.² .......................................... A23G 3/30
[58] Field of Search ................................. 426/3–6

[56] References Cited
UNITED STATES PATENTS

| | | | |
|---|---|---|---|
| 3,352,689 | 11/1967 | Bilotti | 426/3 |
| 3,655,866 | 4/1972 | Bilotti | 426/3 |
| 3,857,965 | 12/1974 | Ream | 426/3 |

*Primary Examiner*—Jeanette M. Hunter

[57] ABSTRACT

A sugarless confectionery or chewing gum composition having improved shelf life is prepared by the incorporation therein of crystalline sorbitol powder which is at least 80 percent by weight of the gamma crystalline polymorph. These novel sugarless gum formulations are twice as soft after 6–9 months as similar gum compositions containing sorbitol in the polymorphic or amorphous crystalline phase.

4 Claims, No Drawings

SUGARLESS CHEWING GUM HAVING IMPROVED SHELF LIFE

This invention relates to a sugarless confectionery composition and, more particularly, to a new improved sugarless chewing gum composition having improved shelf life and softness and stability against hardening.

Consumption of sugarless confectionery compositions, in particular, chewing gums, have drastically increased over those containing sugar because of the efforts by the dental profession to discourage the use of sugar containing confectioneries.

A well known displacement for sugar in food products and confectioneries is sorbitol. Typical applications are described in U.S. Pat. No. 2,432,222 and 3,438,787. Furthermore, the use of polyhydroxy compounds in chewing gum base has been described in U.S. Pat. No. 1,906,207 and more recently where the polyhydroxy compound is sorbitol in U.S. Pat. No. 3,352,689. Before the discovery of a new process for making substantially pure sorbitol crystals in the gamma polymorphic modification as described in co-pending U.S. Ser. No. 463,048 filed Apr. 19, 1974 by Kasehagen, sorbitol powder was available commerically only in the polycrystalline and amorphous crystalline form. Surprisingly, when this new material was substituted in gum formulas for the amorphous or polycrystalline sorbitol powder it was discovered that the gum formulation remained soft and did not become stale within the same time limits experienced by old formulations.

Sorbitol is ordinarily available in concentrated aqueous solution. However, a substantial amount of anhydrous sorbitol is made in the amorphous crystalline powdered form for use in applications such as in the manufacture of pharmaceutical tablets and chewing gum.

A recently discovered process for the manufacture of powdered crystalline sorbitol in the gamma crystalline polymorph led to the discovery of the present invention. Sorbitol powder in the gamma crystalline modification is made according to the following general process. Molten sorbitol in a temperature ranging from 90°–124°C. is passed through a water-cooled mixing device wherein it is subjected to high speed, high shear mixing while simultaneously kneaded and cooled prior to extrusion onto a cooling surface as a dry dough. A more detailed procedure is as follows:

Into a mixer similar to that described in U.S. Pat. No. 3,618,902 having a length of 36 inches, a nominal diameter of 5 inches, a heat exchanger surface area of about 6 sq. feet, and internal volume (exclusive of space occupied by shafts, kneader blades and conveyor screws) of 3.75 gallons (about 0.5 cubic feet), and a nominal horse power ranging of 10 H.P. is fed molten sorbitol heated to a temperature of 96.8°C. at a rate of 50 lbs./hr. with the mixer blades rotated at 31 r.p.m. The water jacket temperature is operated at 15°C. The sorbitol leaving the mixture is in the form of a coarse, single crystalline mass having a temperature slightly above room temperature. The heat of fusion of the material is 45.9 calories per gram and the melting point ranges from 96°–101°C. The material has an X-ray diffraction for gamma sorbitol as shown in Table I entitled "X-ray Diffraction Measurements of Gamma Sorbitol."

While the heat of fusion of gamma sorbitol may range between 38–46 calories per gram for gamma sorbitol made by the above process, which usually results in a composition having at least 80 percent by weight gamma material, it is preferred that material having a heat of fusion of at least 40 calories/gm. be used in chewing gum formulations since a lower heat of fusion indicates the presence of proportionately larger amounts of glassy or amorphous sorbitol polymorph which result in less stable compositions.

TABLE I

X-Ray Diffraction Measurements of Gamma Sorbitol

| $d^1$ (A) | $I/Io^2$ |
|---|---|
| 9.44 | 14 |
| 8.72 | 12 |
| 7.55 | 39 |
| 7.49 | 35 |
| 6.87 | 9 |
| 6.34 | 11 |
| 6.00 | 26 |
| 5.97 | 23 |
| 5.77 | 9 |
| 5.64 | 8 |
| 5.42 | 9 |
| 5.20 | 21 |
| 5.11 | 26 |
| 5.02 | 33 |
| 4.73 | 100 |
| 4.51 | 11 |
| 4.39 | 26 |
| 4.33 | 50 |
| 4.15 | 15 |
| 4.04 | 61 |
| 3.91 | 53 |
| 3.76 | 30 |
| 3.54 | 38 |
| 3.50 | 50 |
| 3.49 | 67 |
| 3.48 | 38 |
| 3.30 | 30 |
| 3.07 | 18 |
| 3.04 | 18 |
| 2.95 | 9 |
| 2.946 | 6 |
| 2.820 | 23 |
| 2.643 | 38 |
| 2.558 | 21 |
| 2.427 | 18 |
| 2.346 | 8 |
| 2.271 | 11 |
| 2.240 | 12 |
| 2.179 | 17 |

$^1d$ = d-spacings; interlayer spacings; angstroms
$^2I/Io$ = Intensity values of individual peaks Sugarless chewing gum formula normally comprise a gum base; powdered sorbitol; synthetic sweeteners; and plasticizers sorbitol solution or vegetable solution such as gum arabic. In addition, flavoring ingredients and fillers such as mannitol, plasticizers such as glycerides may be included.

Chewing gum base is a blend of synthetic and natural products coming within the confines of the U.S. Food, Drug & Cosmetic Law 21 CFR 121.1054. It contains masticatory substances having natural (coagulated or concentrated) latices of vegetable origin. These include Chicle, Perillo, and natural rubber to name a few as well as snthetic latices such as butadienestyrene rubber, butyl rubber, paraffin, polyvinyl acetate, polyethylene and others. In addition are included plasticizing materials such as glycerol esters of rosin, terpene resins and antioxidants such as butylated hydroxyanisole.

It is an object of this invention therefore to provide a sugarless confectionery composition having prolonged softness and increased shelf life.

It is also an object of this invention to provide a new improved sugarless chewing gum composition and a method for preparing it with prescribed amounts of a new ingredient.

It is another object of the invention to provide a sugarless chewing gum composition containing ingredients which have been accepted for use in sugarless chewing gum.

It is another object to provide an improved gum composition which comprises a chewing gum base and an effective amount of sorbitol crystalline material in the gamma polymorphic modification.

These and other objects of the invention are primarily accomplished by the incorporation with chewing gum base of an effective amount of a gamma sorbitol crystalline powder. Chewing gum formulations comprise a matrix of a gum base, usually natural or synthetic blends, in the range of 20–35 percent by weight and typically 25 percent; plasticizers such as aqueous sorbitol 70 percent or vegetable synthetic gum emulsions 5–25 percent and typically 10 percent; glycerine 0–3 percent, and typically 0.5 percent, powdered crystalline sorbitol gamma polymorph 20–60 percent and typically 30 percent; mannitol 0–30 percent and typically 10.5 percent; and flavor, 0.5–2 percent and typically 1 percent. Powdered sorbitol and mannitol are frequently referred to as filler in the trade.

Any suitable manner can be used for forming an intimate mixture of the above-described ingredients. It is found desirable to add the gum base and artificial sweetening solutions to a preheated kettle wherein the ingredients are blended by mixing blades. Desirably the temperature is maintained at 60°C. or below, although slightly higher temperatures can be used in some instances. After the ingredients are thoroughly blended, the crystalline sorbitol and other fillers may be added. The ingredients are thoroughly mixed until uniformly blended. The chewing gum is desirably maintained at a temperature of about 35°C. to about 50°C., preferably 43°C., during further processing such as rolling, kneading, and the like, to the finished form. The gum is then aged on plaques for from 12–72 hours to equilibrate and firm up at which time it is then wrapped. When stored at temperatures between 15°–30°C. and at relative humidities between 33–75 percent the gum retains functional softness.

The following specific Examples are submitted to form a better understanding of the practice of the invention.

EXAMPLE 1

Into a warm sigma blade, steam-heated mixer is added 60°C. preheated gum base. Sorbitol powder having at least 80% gamma modification is dusted over the blades to prevent sticking. About one-third of the powdered ingredients referred to below are then added to the warm gum base. This material is mixed for 2 minutes after which is added 1/3 additional sorbitol powder and gum arabic solution. This is mixed for 2 minutes prior to the addition of the final amount of gamma crystalline sorbitol. After 9 minutes mixing, flavor oil is added and mixed for an additional 3 minutes, a total of 16 minutes.

The material is removed from the mixer and formed into sheets of 0.075 inches in thickenss and stored for 24 hours at about 26°C. at 40% R.H. The sheet is cut into strips, wrapped, and held at 24°C./40% R.H. and tested for softness over a period of time.

| FORMULATION | Grams | % By Weight |
|---|---|---|
| Gum Base: PALOJA* | 590 | 28.32 |
| Gum Arabic Solution (1 day old) (48%) | 185 | 7.32 |
| Gum Arabic Powder | 50 | 1.98 |
| Gamma Sorbitol Powder (92% by wt.) | 950 | 37.55 |
| Mannitol Powder | 725 | 28.66 |
| Flavor | 30 | 1.19 |
| | 2530 | 100.02 |

*A commercially available product of Dreyfus Corp.

The gum mix made by the above procedure using amorphous sorbitol usually produces a slightly or moderately dry mix having a coarse texture. The above formulation using gamma sorbitol, is light in color, smooth in texture, very soft and very much softer than normally expected for gum containing similar amounts of amorphous and mixed crystalline sorbitol.

EXAMPLE 2

Employing a procedure outlined for Example 1, 1/5 of the dry powders are added to the warm mixer to keep the mixture from sticking to the blades. The warm gum base is added and thereafter followed by another 1/5 of the powdered materials in the formulation. The mixer is started, with the addition of 1/2 of the liquids and another 1/5 of the powdered material (these additions should have taken approximately 2 minutes). The remainder of the liquids and powder are thereafter added and mixed for approximately 5 minutes. The flavors are added with an additional 5 minutes of mixing. Total mixing time for the batch is 12 minutes. The gum is sheeted and stored as described in Example 1.

| INGREDIENTS | |
|---|---|
| Gum Base: PALOJA* | 25.04 |
| Sorbitol 70% Aqueous Solution | 20.74 |
| Gamma Crystalline Sorbitol (92%) | 45.05 |
| Mannitol | 7.45 |
| Glycerine | 0.52 |
| Flavor | 1.20 |
| | 100.00 |

*A commercially available product of Dreyfus Corp.

EXAMPLE 3

Employing the procedure of Example 2, the following ingredients were blended to make bubble gum.

| INGREDIENTS | % by Weight Based on Total |
|---|---|
| Bubble Gum Base: (LADCO*) | 24.98 |
| Sorbitol 70% Aqueous Solution | 20.70 |
| Gamma Crystalline Sorbitol (92%) | 52.32 |
| Glycerine | 0.50 |
| Flavor | 1.50 |
| | 100.00 |

*A commercially available product of Dreyfus Corp.

FLEXIBILITY TEST PROCEDURE

Gum is cut down into pieces 7.3 cm. by 1.9 cm. ×0.075 inch thick. Gum is placed on a jig of Instron Tensile Tester and a knife blade, attached to the crosshead flexes the gum through a distance of 14 mm. at a constant speed. As the gum is flexed, a curve is drawn on the recording chart. Using a Digital Integrator, the area under the curve is determined as well as the maximum force required to flex the gum through the premeasured distance.

INTERPRETATION OF RESULTS

In the trade it is advantageous to have a soft pliable gum for as long as possible to satisfy the consumer and reduce the amount of stale gum returned to the manufacturer.

Flexibility is an indication of firmness or staleness. As the gum is flexed, a soft gum will take less force to bend it through the predetermined distance. As the peak value (grams) is low, so will the curve be small hence the area under the curve, expressed as gram/centimeters, will also be low as demonstrated in Table II.

A firm gum obviously will require more force to flex it through 14 mm. More force will necessarily mean a larger curve with more area, i.e., higher energy value.

TABLE II

| Flexibility Test | Shelf Life Evaluation Tests | | | | |
|---|---|---|---|---|---|
| | Gamma Sorbitol of Example 2 (92%) | | | | |
| | Initial | 3 wks. | 6 wks. | 6 mos. | 9 mos. |
| (a) Area Under Curve[1] (gram-centimeters) | 3.3 | 3.6 | 2.4 | 4.0 | 6.0 |
| Maximum Strength[2] (grams) | 130 | 145 | 85 | 180 | 240 |
| | "Regular" Crystalline Sorbitol (mixed Beta & Alpha Polymorphs) | | | | |
| | Initial | 3 wks. | 6 wks. | 6 mos. | 9 mos. |
| (a) Area Under Curve[1] (gram-centimeters) | 8.2 | 6.8 | 5.0 | 9.0 | 11.6 |
| Maximum Strength[2] (grams) | 255 | 220 | 210 | 390 | 575 |

[1]Area under the curve: This is the amount of energy, expressed in gram-centimeters used to flex the gum through the predetermined distance.
[2]Maximum Strength: Amount of force in grams required to flex gum through predetermined distance.

What is claimed is:
1. A sugarless chewing gum formula having incorporated therein an amount of sorbitol in the gamma crystalline polymorph sufficient to extend original softness characteristics when stored at relative humidities ranging between 33 and 75 percent beyond that which would normally be obtained for similar compositions containing powdered sorbitol in the amorphous or mixed crystal polymorphic modifications.
2. A composition of claim 1 wherein said gamma sorbitol powder is characterized by a heat of fusion ranging between 38–46 calories per gram.
3. A composition of claim 1 wherein said gamma sorbitol has a melting range of 96°–101°C.
4. A sugarless chewing gum of claim 1 comprising 20–35 percent by weight gum base; 5–25 percent by weight plasticizers; and 20–60 percent crystalline gamma polymorph sorbitol.

* * * * *